(12) United States Patent
Grootaert et al.

(10) Patent No.: US 7,402,630 B2
(45) Date of Patent: Jul. 22, 2008

(54) CURING COMPOSITIONS FOR FLUOROPOLYMERS

(75) Inventors: Werner M. A. Grootaert, Oakdale, MN (US); Eric W. Adair, Hugo, MN (US); Miguel A. Guerra, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 543 days.

(21) Appl. No.: 11/014,042

(22) Filed: Dec. 16, 2004

(65) Prior Publication Data

US 2006/0135827 A1    Jun. 22, 2006

(51) Int. Cl.
C08F 8/00 (2006.01)
C08F 8/42 (2006.01)
C08F 8/40 (2006.01)
C08G 63/78 (2006.01)
C08L 23/28 (2006.01)

(52) U.S. Cl. .............. 525/326.3; 525/340; 525/343; 525/379; 525/341; 528/275; 528/282; 528/308.6; 524/779; 524/380

(58) Field of Classification Search ............ 570/123; 252/182.11; 525/326.3, 340, 341, 343, 379; 526/247, 253, 255; 524/380, 433, 436
See application file for complete search history.

(56) References Cited

U.S. PATENT DOCUMENTS

| | | |
|---|---|---|
| 3,523,132 A | 8/1970 | Dorfman et al. |
| 3,546,186 A | 12/1970 | Gladding et al. |
| 3,686,143 A | 8/1972 | Bowman |
| 3,740,369 A * | 6/1973 | Proskow .............. 524/107 |
| 3,752,787 A | 8/1973 | Brunner |
| 4,035,565 A | 7/1977 | Apotheker et al. |
| 4,259,463 A * | 3/1981 | Moggi et al. .......... 525/326.3 |
| 4,281,092 A | 7/1981 | Breazeale |
| 4,287,320 A | 9/1981 | Kolb |
| 4,335,238 A | 6/1982 | Moore et al. |
| 4,358,559 A * | 11/1982 | Holcomb et al. ........ 524/380 |
| 4,446,270 A * | 5/1984 | Guenthner et al. ...... 524/433 |
| 4,487,903 A | 12/1984 | Tatemoto et al. |
| 4,550,132 A | 10/1985 | Capriotti |
| 4,564,662 A | 1/1986 | Albin |
| 4,645,799 A | 2/1987 | Wachi et al. |
| 4,649,045 A | 3/1987 | Gaske et al. |
| 4,677,137 A | 6/1987 | Bany et al. |
| 4,734,465 A | 3/1988 | Moggi et al. |
| 4,758,618 A | 7/1988 | Ito et al. |
| 4,762,891 A | 8/1988 | Albin et al. |
| 4,833,212 A | 5/1989 | Yamada et al. |
| 4,882,390 A * | 11/1989 | Kolb ................. 525/326.3 |
| 4,912,171 A | 3/1990 | Grootaert et al. |
| 4,948,853 A | 8/1990 | Logothetis |
| 4,972,038 A | 11/1990 | Logothetis |
| 4,983,680 A | 1/1991 | Ojakaar |
| 5,032,655 A | 7/1991 | Moore |
| 5,077,178 A | 12/1991 | Herbert et al. |
| 5,110,983 A * | 5/1992 | Lau et al. .............. 562/435 |
| 5,262,490 A | 11/1993 | Kolb et al. |
| 5,266,650 A | 11/1993 | Guerra et al. |
| 5,268,405 A | 12/1993 | Ojakaar et al. |
| 5,284,611 A | 2/1994 | Grootaert et al. |
| 5,285,002 A | 2/1994 | Grootaert |
| 5,319,025 A | 6/1994 | Weigelt |
| 5,349,093 A | 9/1994 | Oka et al. |
| 5,371,143 A | 12/1994 | Novak et al. |
| 5,378,782 A | 1/1995 | Grootaert |
| 5,384,374 A | 1/1995 | Guerra et al. |
| 5,451,625 A | 9/1995 | Fukushi |
| 5,527,861 A | 6/1996 | Logothetis |
| 5,554,680 A | 9/1996 | Ojakaar |

(Continued)

FOREIGN PATENT DOCUMENTS

EP    0 140 207 A2    5/1985

(Continued)

OTHER PUBLICATIONS

Brown et al., "Reactions of Perfluoroalkyl Nitriles. V. Synthesis of Perfluoroacyl Imidates", J. Org. Chem., vol. 30, (1965), pp. 3724-3728.

(Continued)

*Primary Examiner*—Duane Smith
*Assistant Examiner*—Ives Wu
(74) *Attorney, Agent, or Firm*—Dena M. Ehrich; C. Michael Geise

(57) ABSTRACT

A curative composition comprising a cation and an anion of the formula $A_n{}^{q-}Q_p{}^{m+}$, wherein m, n, p, and q are positive integers, wherein m*p=n*q, wherein $Q^{m+}$ is an organo onium, and $A^{q-}$ is an anion, provided that at least one $A^{q-}$ is selected from the formula:

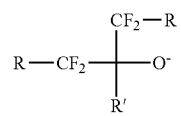

wherein each R independently is H, halo, alkyl, aryl, aralkyl, or cycloalkyl, and which also may be halogenated, fluorinated, or perfluorinated, wherein two or more of R and R' groups may together form a ring, wherein each R group independently may contain one or more heteroatom(s), wherein R' can be the same as R, with the proviso that R' cannot be halo. Also provided are a fluoropolymer composition including this curative, a method of making a fluoropolymer, and fluoropolymer articles containing curable or cured fluoropolymer compositions.

4 Claims, No Drawings

U.S. PATENT DOCUMENTS

| | | | |
|---|---|---|---|
| 5,565,512 A | 10/1996 | Saito et al. | |
| 5,585,449 A | 12/1996 | Arcella et al. | |
| 5,591,804 A | 1/1997 | Coggio et al. | |
| 5,621,145 A | 4/1997 | Saito et al. | |
| 5,639,837 A | 6/1997 | Farnham et al. | |
| 5,654,375 A * | 8/1997 | Jing et al. | 525/326.3 |
| 5,681,881 A | 10/1997 | Jing et al. | |
| 5,700,879 A | 12/1997 | Yamamoto et al. | |
| 5,728,773 A | 3/1998 | Jing et al. | |
| 5,756,588 A | 5/1998 | Kolb et al. | |
| 5,767,204 A | 6/1998 | Iwa et al. | |
| 5,789,489 A | 8/1998 | Coughlin et al. | |
| 5,789,509 A | 8/1998 | Schmiegel | |
| 5,824,749 A | 10/1998 | Sonoi et al. | |
| 5,877,264 A | 3/1999 | Logothetis et al. | |
| 5,891,965 A | 4/1999 | Worm et al. | |
| 5,910,552 A | 6/1999 | Saito et al. | |
| 5,929,169 A | 7/1999 | Jing et al. | |
| 5,945,477 A * | 8/1999 | DeSimone et al. | 524/601 |
| 6,077,609 A | 6/2000 | Blong et al. | |
| 6,114,452 A | 9/2000 | Schmiegel | |
| 6,211,319 B1 | 4/2001 | Schmiegel | |
| 6,245,879 B1 * | 6/2001 | Kelsey et al. | 528/275 |
| 6,255,535 B1 | 7/2001 | Schulz et al. | |
| 6,255,536 B1 | 7/2001 | Worm et al. | |
| 6,279,901 B1 | 8/2001 | Parsonage et al. | |
| 6,281,296 B1 | 8/2001 | McLachlan et al. | |
| 6,294,627 B1 | 9/2001 | Worm et al. | |
| 6,465,576 B1 | 10/2002 | Grootaert et al. | |
| 6,482,522 B1 | 11/2002 | Parsonage et al. | |
| 6,593,416 B2 | 7/2003 | Grootaert et al. | |
| 6,638,999 B2 | 10/2003 | Bish et al. | |
| 6,657,012 B2 | 12/2003 | Grootaert et al. | |
| 6,657,013 B2 | 12/2003 | Grootaert et al. | |
| 6,720,360 B1 | 4/2004 | Grootaert et al. | |
| 6,794,457 B2 | 9/2004 | Grootaert et al. | |
| 6,803,425 B2 | 10/2004 | Hintzer et al. | |
| 6,844,388 B2 | 1/2005 | Grootaert et al. | |
| 6,846,880 B2 | 1/2005 | Grootaert et al. | |
| 6,887,927 B2 | 5/2005 | Grootaert et al. | |
| 6,890,995 B2 | 5/2005 | Kolb et al. | |
| 2002/0026014 A1 | 2/2002 | Bish et al. | |
| 2002/0061977 A1 | 5/2002 | Grootaert et al. | |
| 2002/0145228 A1 | 10/2002 | Kolb et al. | |
| 2002/0177666 A1 | 11/2002 | Grootaert et al. | |
| 2004/0044139 A1 | 3/2004 | Grootaert et al. | |

FOREIGN PATENT DOCUMENTS

| | | |
|---|---|---|
| EP | 0 429 250 A2 | 5/1989 |
| EP | 0 584 678 A1 | 3/1994 |
| EP | 0 661 304 A1 | 7/1995 |
| EP | 0 708 084 A1 | 4/1996 |
| EP | 0 727 413 A1 | 8/1996 |
| EP | 0 754 721 A2 | 1/1997 |
| EP | 0 758 668 A2 | 2/1997 |
| EP | 0 769 521 A1 | 4/1997 |
| EP | 0 784 064 A1 | 7/1997 |
| EP | 1 182 230 A1 | 2/2002 |
| JP | 9-183879 | 7/1997 |
| JP | 2004-285264 | 10/2004 |
| WO | WO 90/14368 | 11/1990 |
| WO | WO 98/54253 | 12/1998 |
| WO | WO 99/48939 | 9/1999 |
| WO | WO 00/09569 | 2/2000 |
| WO | WO 00/09603 | 2/2000 |
| WO | WO 01/02448 A1 | 1/2001 |
| WO | WO 01/05710 A1 | 1/2001 |
| WO | WO 01/57100 A1 | 8/2001 |
| WO | WO 01/59005 A2 | 8/2001 |
| WO | WO 02/060969 A1 | 8/2002 |
| WO | WO 2005/000917 A1 | 1/2005 |

OTHER PUBLICATIONS

Yakubovich et al., "Syntheses in the 1,3,5-Triazine Series V. Iminoesters of Perfluorocarboxylic Acids-Synthese, Properties, and Mechanism of Cyclopolymerization to 1,3,5-Triazine Derivatives", pp. 878-885, (translated from Zhurnal Obshchei Khimii, vol. 36, No. 5, pp. 863-871, May 1966).

Grinblat et al., "Infrared Investigation of The Vulcanization of Perfluoroalkylenetriazine Polymers", Polymer Science U.S.S.R., vol. 21, 1980, pp. 1434-1441.

Paciorek et al., "Reactions of Perfluoronitriles. I. Interactions with Aniline", Journal of Fluorine Chemistry, 30 (1985), pp. 241-250.

* cited by examiner

CURING COMPOSITIONS FOR FLUOROPOLYMERS

TECHNICAL FIELD

This invention relates to a curative composition as well as curable and cured fluoropolymer compositions, methods of making fluoropolymer compositions, and fluoropolymer articles. The fluoropolymer articles can be clear or even crystal clear.

BACKGROUND

Fluoroelastomers are cured or crosslinked and generally are tolerant to high temperatures and harsh chemical environments. They are particularly useful as seals, gaskets, and molded parts in systems that are exposed to elevated temperatures and/or corrosive materials. For sealing applications that require resistance to the most extreme conditions, perfluorinated elastomers are used. Such parts are used in applications such as automotive, chemical processing, semiconductor, aerospace, and petroleum industries, among others.

Fluoroelastomers often include a cure-site component to facilitate cure in the presence of a curative or catalyst. One class of useful cure-site components used in perfluoroelastomers includes nitrile group-containing monomers, for which organotin catalysts have been used as curing components. However, such catalysts can leave undesirable extractable metal residues in the cured product and are undesirable for environmental reasons. Ammonia-generating compounds have also been used as a cure system component in fluoroelastomers, but these cure systems lack the desired level of rheology control during processing. In addition, most known fluoroelastomers are cured into colored or opaque materials. A few fluoroelastomers or perfluoroelastomers have been described as colorless and/or transparent, yet can be cloudy or milky in appearance, and have rather high compression set when made into seals, even when measured at relatively low temperatures (up to 200° C.).

SUMMARY

In one aspect, the invention relates to a curative composition comprising a cation and an anion of Formula I:

$$A_n^{q-} Q_p^{m+} \qquad (I)$$

wherein m, n, p, and q are positive integers, wherein m*p=n*q, wherein $Q^{m+}$ is an organo onium, and $A^{q-}$ is an anion, and provided that at least one $A^{q-}$ is selected from Formula II:

(II)

where, in this Formula II, each R independently is H, halo, alkyl, aryl, aralkyl, or cycloalkyl, and which also may be halogenated, fluorinated, or perfluorinated, wherein two or more of R and R' groups may together form a ring, wherein each R group independently may contain one or more heteroatom(s), wherein R' can be the same as R, with the proviso that R' cannot be halo.

In another aspect, the invention relates to a curative composition suitable for fluoroelastomers comprising an anion of Formula III:

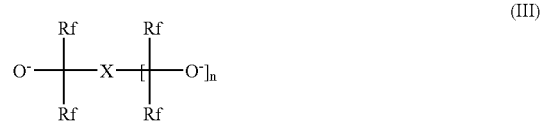

(III)

where, in this Formula III, each $R_f$ independently is R—CF$_2$ or a perfluoroalkyl group having from 1 to 8 carbon atoms, wherein R is H, halo, alkyl, aryl, or cycloalkyl, having up to 8 carbon atoms and which also may be halogenated, fluorinated, or perfluorinated, and which may contain a heteroatom, wherein X is a non-fluorinated, partially-fluorinated, or perfluorinated linking group, and wherein n is a positive integer.

In another aspect, the invention relates to a method of making a curative composition such as described above, the method comprising providing a cation and an anion, wherein the anion is prepared by reacting a parent alcohol with a base, such as a tetraalkyl phosphonium or ammonium hydroxide. In another aspect, the anion can be derived by reacting a parent alcohol with a metal hydroxide or alkoxide, such as sodium methoxide, and adding an onium halide, such as an onium chloride, in a solvent, such as methanol, and optionally precipitating the resulting halide salt.

In another aspect, the invention relates to a fluoroelastomer composition comprising a fluoroelastomer comprising nitrogen-containing cure sites; and a cation and an anion of Formula I:

$$A_n^{q-} Q_p^{m+} \qquad (I)$$

wherein m, n, p, and q are positive integers, wherein m*p=n*q, wherein Q is H or a Group I or Group II metal or $Q^{m+}$ is an organo onium, and $A^{q-}$ is an anion, provided that at least one $A^{q-}$ is selected from Formula II:

(II)

where, in Formula II, each R independently is H, halo, alkyl, aryl, aralkyl, or cycloalkyl, and which also may be halogenated, fluorinated, or perfluorinated, wherein two or more of R and R' groups may together form a ring, wherein each R group independently may contain one or more heteroatom(s), wherein R' can be the same as R, with the proviso that R' cannot be halo.

In another aspect, the invention relates to making a fluoropolymer composition comprising forming a mixture of a curative composition as described above, including a fluoroelastomer having interpolymerized units of a nitrogen-containing cure site monomer, and which fluoroelastomer may or may not be perfluorinated. The invention relates to making a fluoropolymer article comprising shaping a mixture of a fluoropolymer composition as described above, curing the shaped mixture to form an article, and optionally post curing the article.

The invention also provides articles containing the curable or cured compositions such as sheets, films, hoses, gaskets, and O-rings. The invention is particularly desirable for articles with good physical properties and low compression set at high temperatures. In some embodiments, the inventive materials are translucent, or even transparent, to light, such as visible light. In some embodiments, the present invention provides crystal clear perfluoroelastomers with low compression set and other desirable physical properties.

The inventive curative compositions are, for example, suitable for curing polymers, especially fluoroelastomers. These curative compositions typically provide several advantages for curing fluoroelastomers, especially perfluoroelastomers, having nitrogen-containing cure site monomers, such as the high temperature performance properties sought when selecting organotin compounds, ammonia-generating compounds, or even perfluoroadipates as the curative or catalyst system with such fluoroelastomers. In particular, several aspects of the present invention provide or include a class of catalysts that generate triazine crosslinks in perfluoroelastomers more effectively than any known catalyst.

The inventive fluoroelastomer compositions generally maintain the advantages involved with using fluoroelastomers having nitrogen-containing cure site monomers, such as the high temperature performance properties typically achieved when organotin compounds or ammonia-generating compounds are used as the catalyst system with such cure site monomers. Concurrently, the inventive fluoroelastomer compositions may exhibit improved properties, such as better compression set values, compared to materials made using the known organotin compounds, or other known cure catalysts.

The inventive compositions particularly are desirable in applications where high temperature exposure and/or harsh chemical exposure are expected. In some embodiments, the inventive compositions provide a pristine appearance commensurate with their high purity and high quality.

The details of embodiments of the invention are set forth in the description below. Other features, objects, and advantages of the invention will be apparent from the description and from the claims below.

DETAILED DESCRIPTION

The curative composition of the present invention involves a cation and an anion. More particularly, the curative comprises a composition an anion of Formula I:

$$A_n^{q-}Q_p^{m+} \quad (I).$$

In this Formula, m, n, p, and q are positive integers, and $m*p=n*q$, such that the charge balances. Additionally, $Q^{m+}$ is an organo onium, and $A^{q-}$ is an anion. At least one $A^{q-}$ is selected from Formula II:

where, in this Formula II, each R independently is H, halo, alkyl, aryl, aralkyl, or cycloalkyl, and which also may be halogenated, fluorinated, or perfluorinated, wherein two or more of R and R' groups may together form a ring, wherein each R group independently may contain one or more heteroatom(s), wherein R' can be the same as R, with the proviso that R' cannot be halo. While not being bound by any particular theory, it is believed that allowing R' to be a halo group would be result in it being expelled as a halide anion with subsequent conversion of the parent alkoxide into a carbonyl compound.

For example, each R can be F such that the central carbon of the anion is bonded to two perfluoromethyl groups. In addition, R' can be selected from the group consisting of H, phenyl, methoxyphenyl, toluyl, phenoxy, fluorophenyl, trifluoromethylphenyl, and $CF_3$.

More particularly, the anion can substituted or unsubstituted. Examples include tetra-alkylammonium 2-phenyl-1,1,1,3,3,3 hexafluoroisopropanolate, tetra-alkylammonium 1,1,1,3,3,3 hexafluoroisopropanolate, tetrabutylphosphonium 2-phenyl-1,1,1,3,3,3 hexafluoroisopropanolate, tetrabutylphosphonium 1,1,1,3,3,3 hexafluoroisopropanolate, tetrabutylphosphonium 2-methoxyphenyl-1,1,1,3,3,3 hexafluoroisopropanolate, and tetrabutylphosphonium 2-p-tolul-1,1,1,3,3,3 hexafluoroisopropanolate.

In another embodiment, the invention provides a curative composition suitable for fluoroelastomers comprising an anion of Formula III:

where, in this Formula III, each $R_f$ independently is $R-CF_2$ or a perfluoroalkyl group having from 1 to 8 carbon atoms, wherein R is H, halo, alkyl, aryl, or cycloalkyl, having up to 8 carbon atoms and which also may be halogenated, fluorinated, or perfluorinated, and which may contain a heteroatom, wherein X is a non-fluorinated, partially-fluorinated, or perfluorinated linking group, and wherein n is a positive integer. The linking group can be aryl, lower alkylene (e.g., C1-C10), and may contain a heteroatom. The linking group may be substituted with halo, lower alkyl (having from 1 to about 10 carbon atoms). With this curative, one or more cation(s) can be used to balance the charge. Any suitable cation(s) can be used, as described below.

In another embodiment, the invention provides a curative composition suitable for fluoroelastomers comprising a cation and an anion of Formula IV:

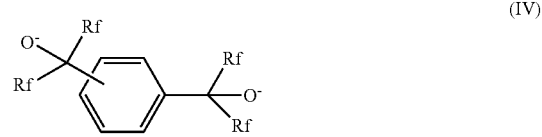

where, in this Formula IV, each $R_f$ independently is $R-CF_2$ or a perfluoroalkyl group having from 1 to 8 carbon atoms. Also in this Formula, R is H, halo, alkyl, aryl, or cycloalkyl, having up to 8 carbon atoms and which also may be halogenated, fluorinated, or perfluorinated, and which may contain a heteroatom. In addition, the aryl group may be substituted, e.g., with a halo, lower alkyl (e.g., C1-C10), and it may contain a heteroatom.

The curative composition also may further comprise an organic or inorganic base. The curative composition of the present invention can be provided in many forms, for example, the cation and/or the anion can be made in situ, such as by reacting one or more free alcohol precursor(s) with a suitable base in an overall composition. Suitable bases include, for example, $Ca(OH)_2$, MgO, and combinations thereof. Further, the precursors to the curative may be provided into a fluoropolymer composition, such that the curative forms in situ and/or such that the effective components of the curative arise during typical fluoropolymer operations such as milling a fluoroelastomer. More particularly, the precursor materials leading to the curative composition can be combined by adding the cation component(s) and/or the anion component(s) separately into a fluoropolymer composition.

These inventive curative compositions can be used, for example, to cure or crosslink fluoropolymers, such as those described below. Thus, these curatives can be mixed with fluoroelastomers or perfluoroelastomers.

In another embodiment, the present invention provides a fluoroelastomer composition comprising a fluoroelastomer having interpolymerized units derived from a nitrogen-containing cure site monomer along with a curative as will now be described. This curative comprises a cation and an anion of Formula I (above) wherein m, n, p, and q are positive integers, wherein $m*p=n*q$, wherein Q is H or a Group I or Group II metal ion, or $Q^{m+}$ is an organo onium, and $A^{q-}$ is an anion, provided that at least one $A^{q-}$ is selected from Formula II (above) wherein each R independently is H, halo, alkyl, aryl, aralkyl, or cycloalkyl, and which also may be halogenated, fluorinated, or perfluorinated, wherein two or more of R and R' groups may together form a ring, wherein each R group independently may contain one or more heteroatom(s), wherein R' can be the same as R, with the proviso that R' cannot be halo.

In one embodiment of the present invention, each $R_f$ is $CF_3$. In another embodiment of the present invention, Q is H in Formula I.

Any cation that does not substantially interfere with the desired result can be used. For example, the cation can be organic or inorganic. As examples, in some embodiments, the cation is an organic onium, or the cation is selected from the group consisting of Group I and Group II metal ions (referring to the Periodic Table of the Elements). In other embodiments, presently preferred cations include sodium, cesium, calcium, magnesium, and combinations thereof. In some embodiments, the cation is selected to provide a curative for a white or a clear elastomer.

In some embodiments, the fluoropolymer composition may include interpolymerized units derived from tetrafluoroethylene (TFE), chlorotrifluoroethylene (CTFE), and/or one or more ethylenically-unsaturated monomers represented by the formulas $CF_2=CF-R_f^1$, $CF_2=CF-O-R_f^2$, and $CH_2=CR_2$, wherein $R_f^1$ is a perfluoroalkyl; $R_f^2$ is a perfluoroalkyl, or a perfluoroalkoxy; and each R is independently selected from H, F, Br, I, Cl, or a aliphatic group. In some embodiments, the perfluoroalkyl, perfluoroalkoxy, and aliphatic groups may have F, Br, I, or Cl substituents. In some embodiments, the fluoropolymer composition may include interpolymerized units derived from perfluoro alkyl vinyl ether(s), perfluoro alkoxy vinyl ether(s), perfluoro alkene ether(s), and/or perfluoro alkoxy alkene ether(s).

Suitable fluoropolymers include interpolymerized units derived from a nitrogen-containing cure site monomer and, preferably, at least two principal monomers. Examples of suitable candidates for the principal monomer include perfluoroolefins (e.g., tetrafluoroethylene (TFE) and hexafluoropropylene (HFP)), chlorotrifluoroethylene (CTFE), perfluorovinyl ethers (e.g., perfluoroalkyl vinyl ethers and perfluoroalkoxy vinyl ethers), and optionally, hydrogen-containing monomers such as olefins (e.g., ethylene, propylene, and the like), and vinylidene fluoride (VDF). Such fluoropolymers include, for example, fluoroelastomer gums and perfluoroelastomer gums.

When the fluoropolymer is halogenated, preferably perfluorinated, it contains at least 50 mole percent (mol %) of its interpolymerized units derived from TFE and/or CTFE, optionally including HFP. The balance of the interpolymerized units of the fluoropolymer (10 to 50 mol %) is made up of one or more perfluoro vinyl ethers and a nitrogen-containing cure site monomer (e.g., a nitrile-containing vinylether or an imidate containing vinylether). The cure site monomer makes up from about 0.1 to about. 5 mol % (more preferably from about 0.3 to about 2 mol %) of the elastomer. The invention is useful particularly in providing perfluoropolymers such as perfluoroelastomers.

When the fluoropolymer is not perfluorinated, it may contain from about 5 to about 90 mol % of its interpolymerized units derived from TFE, CTFE, and/or HFP, from about 5 to about 90 mol % of its interpolymerized units derived from VDF, ethylene, and/or propylene, up to about 40 mol % of its interpolymerized units derived from a vinyl ether, and from about 0.1 to about 5 mol % (more preferably from about 0.3 to about 2 mol %) of a nitrogen-containing cure site monomer.

The fluoroelastomer compositions of the invention are derived from interpolymerized units of fluorinated monomers such as those having the formula $CF_2=CF-R_f$, wherein $R_f$ is fluorine or a $C_1$-$C_8$ perfluoroalkyl, along with hydrogen-containing $C_2$-$C_9$ olefins, which have less than half of the hydrogen atoms substituted with fluorine, more preferably less than one-fourth of the hydrogen atoms substituted with fluorine, and which are non-fluorinated in other embodiments. In some embodiments, the non-fluorinated olefin is absent.

Hydrogen-containing olefins useful in the invention include those of the formula $CX_2=CX-R$, wherein each X is, independently, hydrogen or fluorine or chlorine, R is hydrogen, fluorine, or a $C_1$-$C_{12}$, preferably $C_1$-$C_3$, alkyl. Preferred olefins include partially-fluorinated monomers (e.g., vinylidene fluoride) or hydrogen-containing monomers such as olefins including a-olefins (e.g., ethylene, propylene, butene, pentene, hexene, and the like). Combinations of the above-mentioned materials are also useful.

Perfluorinated vinyl ethers also are suitable as comonomers in the present invention. These include, for example, monomers described in U.S. Pat. Nos. 6,255,536 and 6,294,627 (Worm, et al., herein incorporated by reference) which includes perfluorinated vinyl ethers such as $CF_2=CF(CF_2)_m-[O(CF_2)_p]_n-OR_f$, including vinyl formals such as $R_fOCF_2OCF=CF_2$, where $R_f$ can contain oxygen, wherein $R_f$ is a linear or branched perfluorinated aliphatic group that may contain oxygen atoms thereby forming additional ether linkages, and wherein m is 0-4, n is 0-6, and p is 1-3, provided that m and n are not both 0.

Such perfluorovinylethers include, for example, $CF_2=CFOCF_3$, $CF_2=CF-O-CF_2-O-CF_3$, $CF_2=CF-O-CF_2-O-CF_2CF_3$, $CF_2=CF-O-CF_2-O-CF_2CF_2CF_3$, $CF_2=CFOCF_2CF_2OCF_3$, $CF_2=CFOCF_2CF_2CF_2OCF_3$, $CF_2=CFOCF_2CF_2CF_3$, $CF_2=CF-O-CF_2CF(CF_3)-O-CF_3$, $CF_2=CFOCF_2CF(CF_3)OCF_2CF_2CF_3$, $CF_2=CF-O-CF_2CF_2-O-CF_2-O-CF_2-O-CF_3$, and $CF_2=CFOCF_2CF(CF_3)OCF_2CF(CF_3)OCF_2CF_2CF_3$.

In addition, the fluoropolymers of the invention may include interpolymerized units of fluoro (alkene ether) monomers, including those described in U.S. Pat. No. 5,891,965 (Worm and Guerra) and U.S. Pat. No. 6,255,535 (Schulz, et al.), the disclosures of each of which are herein incorporated by reference. Such monomers include, for example, $CF_2=CF(CF_2)_m-O-R_f$ wherein m is an integer from 1 to 4, and wherein $R_f$ is a linear or branched perfluoroalkylene group that may include oxygen atoms thereby forming additional ether linkages, and wherein $R_f$ contains from 1-20, more preferably from 1 to 10, carbon atoms in the backbone, and wherein $R_f$ also may contain additional terminal unsaturation sites. $R_f$ groups containing such oxygen atoms are referred to as perfluoroalkyleneoxy groups. Useful monomers include the perfluoroallyl ethers represented by the formula: $CF_2=CF-CF_2-O-R_f$, where $R_f$ is defined above in this paragraph. Exemplary perfluoroalkeneether compounds include those selected from the group consisting of $CF_2=CFCF_2-O-CF_3$, $CF_2=CFCF_2-O-CF_2-O-CF_3$, $CF_2=CFCF_2-O-CF_2CF_2-O-CF_3$, $CF_2=CFCF_2-O-CF_2CF_2-O-CF_2-O-CF_2CF_3$, $CF_2=CFCF_2-O-CF_2CF_2-O-CF_2CF_2CF_2-O-CF_3$, $CF_2=CFCF_2-O-CF_2CF_2-O-CF_2CF_2-O-CF_2-O-CF_3$, $CF_2=CFCF_2CF_2-O-CF_2CF_2CF_3$.

One example of a useful fluoropolymer is composed of principal monomer units of tetrafluoroethylene and at least one perfluoroalkyl vinyl ether. In such copolymers, the copolymerized perfluorinated ether units constitute from about 1 to about 60 mol % (more preferably 10 to 40 mol %) of total monomer units present in the polymer.

One or more other fluoropolymers may be incorporated into the fluoropolymer having interpolymerized units derived from a nitrogen-containing cure site monomer. In addition, one or more other fluoropolymers (which may include one or more copolymers) may be blended with the fluoropolymer (which may comprise a copolymer) having interpolymerized units derived from a nitrogen-containing cure site monomer. Such other fluoropolymers useful in a blend and/or copolymer include the entire array described above, and including homopolymers and copolymers comprising the interpolymerized units mentioned above. For example, polytetrafluoroethylene (PTFE) and PFA (tetrafluoroethylene-perfluorovinylether) are useful. The other fluoropolymer(s) may lack interpolymerized units derived from a nitrogen-containing cure site monomer and/or may include reactive sites adapted to a selected curative system. For example, two different fluoropolymers, each having interpolymerized units derived from a nitrogen-containing cure site monomer, such as a monomer comprising a nitrile group, may be blended to provide the fluoropolymer for the present invention.

Another fluoropolymer may be included along with another curative, such as described below, to provide particular properties. For example, a fluoropolymer suitable for peroxide curing and a peroxide curative may be included to improve chemical stability. Such a blend balances the thermal stability and the chemical stability of the resultant blend, and also may provide economic benefits. These other curatives also may be used to cure a blend of fluoropolymers having nitrogen-containing cure site monomers without the need to include a fluoropolymer lacking a nitrogen-containing cure site monomer.

The fluoropolymer(s) having nitrogen-containing cure site monomers preferably make up enough of the total fluoropolymer to provide increased thermal stability over a comparative fluoropolymer that lacks the composition of the present invention. This amount is generally at least 25 weight percent (wt %), more preferably at least 50 wt %, of the total fluoropolymer in the invention. In some embodiments, the fluoropolymer component is comprised entirely of fluoropolymer(s) with nitrogen-containing interpolymerized units.

The useful fluoropolymers may be prepared by known methods. For example, the polymerization process can be carried out by free-radical polymerization of the monomers as an aqueous emulsion polymerization or as a solution polymerization in an organic solvent. When fluoropolymer blends are desired, a preferable route of incorporation is through blending the fluoropolymer latices in the selected ratio, followed by coagulation and drying.

The nature and the amount of end groups in the fluoroelastomers of the invention can vary. For example, the polymer can contain $SO_3^{(-)}$ end groups generated by an APS/sulfite system, or the polymer may contain $COO^{(-)}$ end groups generated by an APS initiator system or the fluoroelastomer can have "neutral", non-ionic end groups, e.g., those generated by the use of fluorosulfinate initiator systems (see U.S. Pat. Nos. 5,378,782 and 5,285,002 which are herein incorporated by reference) or organic peroxides. Chain transfer agents of any kind can significantly reduce the number of ionic or polar end groups. If desired, such as for improved processing, the presence of strong polar end groups such as $SO_3^{(-)}$ can be minimized and in the case of $COO^{(-)}$ or other unstable end groups, the amount can be reduced through known post treatments (e.g., decarboxylation, post-fluorination).

Fluoropolymers of the invention include a cure site component, which enables curing the fluoropolymer. The cure site component can be partially or fully fluorinated. At least one cure site component of at least one fluoropolymer comprises a nitrogen-containing group. Examples of nitrogen-containing groups useful in the cure site monomers of the present invention include nitrile, imidate, amidine, amide, imide, and amine-oxide groups. Useful nitrogen-containing cure site monomers include nitrile-containing fluorinated olefins and nitrile-containing fluorinated vinyl ethers, such as: $CF_2=CFO(CF_2)_LCN$; $CF_2=CFO(CF_2)_uOCF(CF_3)CN$; $CF_2=CF[OCF_2CF(CF_3)]_rO(CF_2)_tCN$; $CF_2=CFO[CF_2CF(CF_3)O]_q(CF_2O)_yCF(CF_3)CN$; and; wherein L=2-12; q=0-4; r=1-2; y=0-6; t=1-4; and u=2-6. Representative examples of such monomers include $CF_2=CFO(CF_2)_3OCF(CF_3)CN$, perfluoro(8-cyano-5-methyl-3,6-dioxa-1-octene), and $CF_2=CFO(CF_2)_5CN$ (MV5CN).

Another suitable cure site component useful in the present invention is a fluoropolymer or fluorinated monomer material containing a halogen that is capable of participation in a peroxide cure reaction. Such a halogen may be present along a fluoropolymer chain and/or in a terminal position. Typically the halogen is bromine or iodine. Copolymerization is preferred to introduce the halogen in a position along a fluoropolymer chain. In this route, a selection of the fluoropolymer components mentioned above are combined with a suitable fluorinated cure site monomer. Examples of the bromo- or iodo- fluorolefins include: bromodifluoroethylene, bromotrifluoroethylene, iodotrifluoroethylene, 1-bromo-2,2-difluoroethylene, and 4-bromo-3,3,4,4-tetrafluorobutene-1, and the like, and examples of the bromo- or iodo- fluorovinyl ethers include: $BrCF_2OCF=CF_2$, $BrCF_2CF_2OCF=CF_2$, $BrCF_2CF_2CF_2OCF=CF_2$, $CF_3CF(Br)CF_2OCF=CF_2$, and the like. In addition, non-fluorinated bromo- or iodo- olefins, e.g., vinyl bromide and 4-bromo-1-butene, can be used.

The amount of cure site component in a side chain position of the fluoropolymer generally is from about 0.05 to about 5 mol % (more preferably from 0.1 to 2 mol %).

The cure site component may also occur in the terminal position of a fluoropolymer chain. Chain transfer agents or initiators are used to introduce the halogen in a terminal position. Generally, a suitable chain transfer agent is introduced in the reaction medium during polymer preparation, or derived from a suitable initiator.

Examples of useful chain transfer agents include those having the formula $R_fZ_x$ wherein $R_f$ is a substituted or unsubstituted $C_1$-$C_{12}$ fluoroalkyl radical, which may be perfluorinated, Z is Br or I, and x is 1 or 2. Specific examples involving bromide include: $CF_2Br_2$, $Br(CF_2)_2Br$, $Br(CF_2)_4Br$, $CF_2(Cl)Br$, $CF_3CF(Br)CF_2Br$, and the like.

Useful initiators include, e.g., $NaO_2S(CF_2)_nX$, wherein X is Br or I, and n is 1-10.

The amount of cure site component in a terminal position in the fluoropolymer is generally from about 0.05 to about 5 mol % (more preferably from 0.1 to 2 mol %).

Combinations of cure site components also are useful in the present invention. For example, a fluoropolymer containing a halogen that is capable of participation in a peroxide cure reaction may also contain a nitrogen-containing cure site component such as a nitrile group-containing cure site component. Generally, from about 0.1 to about 5 mol % (more preferably from about 0.3 to about 2 mol %) of the total cure site component is incorporated into the fluoropolymer.

An effective amount of the curative is used to crosslink the fluoropolymer. When the amount of curative is too low, the fluoropolymer may not crosslink sufficiently to develop the desired physical properties and/or may crosslink more slowly than desired. When the amount of curative is too high, the fluoropolymer may crosslink into a material that is less compliant than desired and/or may crosslink too rapidly for the desired process conditions. The selection of the particular parts of a composition can affect the amount of curative desired. For example, the type and/or amount of filler selected may retard or accelerate curing relative to a similar, but unfilled, composition, requiring an appropriate adjustment in the amount of curative that is known to those skilled in the field.

The composition of the fluoropolymer also affects the desired amount of one or more curatives. For example, when a blend of a fluoropolymer with interpolymerized units of a nitrogen-containing cure site monomer and another fluoropolymer lacking nitrogen-containing cure sites is used, an effective amount of a first selected curative compound can be used to crosslink the fluoropolymer having interpolymerized units derived from a nitrogen-containing cure site monomer together with an effective amount of a second selected curative compound used to crosslink the other fluoropolymer. The first and second selected curatives may have the same or different composition. That is, either one or both selected curatives may function to crosslink either one or both fluoropolymers.

Generally, the effective amount of curative, which may include more than one composition, is at least about 0.1 parts curative per hundred parts of gum on a weight basis (phr), more preferably at least about 0.5 phr. The effective amount of curative generally is below about 10 phr, (more preferably below about 5 phr).

The fluoropolymer composition curing can also be modified by using other types of curatives along with the catalyst of the present invention. Examples of such curatives are known and include bis-aminophenols (e.g., U.S. Pat. Nos. 5,767,204 and 5,700,879), bis-amidooximes (e.g., U.S. Pat. No. 5,621,145), and ammonium salts (e.g., U.S. Pat. No. 5,565,512). In addition, organometallic compounds of arsenic, antimony, and tin can be used (e.g., U.S. Pat. Nos. 4,281,092, and 5,554,680). Particular examples include allyl-, propargyl-, triphenyl- allenyl-, and tetraphenyltin and triphenyltin hydroxide. The disclosures of each of these documents is herein incorporated by reference.

The fluoroelastomer compositions of the invention can be cured using one or more ammonia-generating compounds along with the curatives described above. "Ammonia-generating compounds" include compounds that are solid or liquid at ambient conditions but that generate ammonia under conditions of cure. Such compounds include, for example, hexamethylenetetramine (urotropin), dicyandiamide, and metal-containing compounds of the formula $A^{w+}(NH_3)_xY^{w-}$, wherein $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion, typically a halide, sulfate, nitrate, acetate or the like; and x is an integer from 1 to about 7.

Also useful as ammonia-generating compounds are substituted and unsubstituted triazine derivatives such as those of the formula:

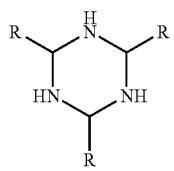

wherein R is a hydrogen atom or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

The fluoroelastomer compositions of the invention, including the nitrogen-containing cure site monomer-containing fluoropolymer alone, can be cured using one or more peroxide curatives along with a curative as described above. Suitable peroxide curatives generally are those which generate free radicals at curing temperatures, such as those described in WO 99/48939, the disclosure of which is herein incorporated by reference. Dialkyl peroxide and bis(dialkyl peroxide), each of which decomposes at a temperature above 50° C., are especially preferred. In many cases it is preferred to use a di-tertiarybutyl peroxide having a tertiary carbon atom attached to peroxy oxygen atom. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate. Generally, about 1 to 3 parts of peroxide per 100 parts of perfluoroelastomer is used.

Another combination curative useful in the present invention has the general formula $CH_2=CHR_fCH=CH_2$, wherein one or more H atoms may be replaced with halogen atoms, such as F, and $R_f$ is a $C_1$-$C_8$ linear or branched and at least partially fluorinated alkylene, cycloalkylene, or oxyalkylene. Similarly, polymers containing pendant groups of $CH_2=CHR_f$— are also useful as curatives in the present invention. Such curatives are described, for example, in U.S. Pat. No. 5,585,449.

The combination of curative(s) is generally from about 0.01 to about 10 mol % (more preferably from about 0.1 to about 5 mol %) of the total fluoropolymer amount.

The fluoropolymer compositions can include any of the adjuvants commonly employed in curable fluoropolymer formulations. For example, one material often blended with a fluoropolymer composition as a part of a curative system is a coagent (sometimes also referred to as a co-curative) composed of a polyunsaturated compound that is capable of cooperating with the peroxide curative to provide a useful cure.

These coagents are particularly useful in combination with a peroxide curative. The coagent(s) can generally be added in an amount equal to between 0.1 and 10 parts coagent per hundred parts fluoropolymer (phr), preferably between 1 and 5 phr. Examples of coagents useful with the present invention include triallyl cyanurate; triallyl isocyanurate; tri(methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bis-olefins disclosed in EP0661304A1, EP0784064A1, EP0769521A1, and U.S. Pat. No. 5,585,449, which are herein incorporated by reference.

Thus, a particular composition of the present invention may include two or more fluoropolymer(s) (provided that at least one fluoropolymer includes interpolymerized units derived from a nitrogen-containing cure site monomer), an amidine curative, a peroxide curative selected to crosslink one or more than one of the fluoropolymer(s), and optionally a coagent such as triallyl isocyanurate.

Additives such as carbon black, stabilizers, plasticizers, lubricants, fillers including silica and fluoropolymer fillers (e.g., PTFE and/or PFA (perfluoroalkoxy) fillers), and processing aids typically utilized in fluoropolymer compounding can be incorporated into the compositions, provided that they have adequate stability for the intended service conditions. In some embodiments, additives that detrimentally affect the clarity of the composition are avoided. In particular, low temperature performance can be enhanced by incorporation of perfluoropolyethers, as described above.

Fillers such as silica and/or carbon black fillers can be used to balance properties such as modulus, tensile strength, elongation, hardness, abrasion resistance, conductivity, and processability of the compositions. Suitable examples include Aerosil® fumed silica from Degussa A G, and carbon blacks such as MT blacks (medium thermal black) designated N-991, N-990, N-908, and N-907; FEF N-550; and large particle size furnace blacks. When carbon black is used, 1 to 70 parts filler per hundred parts fluoropolymer (phr) generally is sufficient.

One of the advantages of selected embodiments of the present invention is a clear fluoroelastomer or perfluoroelastomer. Of course, in this version, grease, oil, dust, fillers such as carbon black, and the like, generally are undesirable when compounding the fluoropolymer to ensure that the clarity is not compromised by contaminants.

One or more acid acceptors can also be added to the formulations. However, where the presence of extractable metallic compounds is undesirable (such as for semiconductor applications) the use of inorganic acid acceptors can be minimized, and or avoided altogether. Commonly used acid acceptors include, for example, zinc oxide, calcium hydroxide, calcium carbonate, magnesium oxide, silicon dioxide (silica), etc. These compounds generally are used in the fluoropolymer formulation to bind any HF or other acids that might be generated at the high temperatures such as may be encountered during curing steps or at the temperatures of fluoropolymer end use.

The curable fluoropolymer compositions of the invention may also be combined with other curable fluoropolymer compositions such as peroxide-curable fluoropolymer compositions. These additional curable fluoropolymer compositions may also employ small amounts of cure site monomers as a comonomer. Suitable cure site monomers are those which, when combined with a curative (e.g., a peroxide) and, preferably a coagent, will provide a cured composition. Preferably these cure site monomers include at least one halo group (e.g., a bromo or an iodo group).

The curable fluoropolymer compositions can be prepared by mixing one or more fluoropolymer(s), the catalyst, any selected additive or additives, any additional curatives (if desired), and any other adjuvants (if desired) in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. The temperature of the mixture during the mixing process typically is kept safely below the curing temperature of the composition. Thus, the temperature typically should not rise above about 120° C. During mixing, it generally is preferable to distribute the components and adjuvants uniformly throughout the gum.

The mixture is then processed and shaped, such as by extrusion (e.g., into the shape of a film, tube, or hose) or by molding (e.g., in the form of sheet or an O-ring). The shaped article can then be heated to cure the fluoropolymer composition and form a cured article.

Molding or press curing of the compounded mixture usually is conducted at a temperature sufficient to cure the mixture in a desired time duration under a suitable pressure. Generally, this is between about 95° C. and about 230° C., preferably between about 150° C. and about 205° C., for a period of from about 1 minute to 15 hours, typically from 5 minutes to 30 minutes. A pressure of between about 700 kPa and about 21,000 kPa is usually imposed on the compounded mixture in a mold. The molds may be first coated with a release agent and baked.

The molded mixture or press-cured article is then usually post-cured (e.g., in an oven) at a temperature and for a time sufficient to complete the curing, usually between about 150° C. and about 300° C., typically at about 230° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably about 300° C., and this value is held for about 4 hours or more. This post-cure step generally completes the cross-linking and may also release residual volatiles from the cured compositions. One example of a suitable post-cure cycle involves exposing molded parts to heat under nitrogen using six stages of conditions. First, the temperature is increased from 25 to 200° C. over 6 hours, then the parts are held at 200° C. for 16 hours, after which the temperature is increased from 200 to 250° C. over 2 hours. Then the parts are held at 250° C. for 8 hours, after which the temperature is increased from 250 to 300° C. over 2 hours. Then the parts are held at 300° C. for 16 hours. Finally, the parts are returned to ambient temperature such as by shutting off the oven heat.

An optically transparent fluoropolymer of the invention is intrinsically capable of allowing transmission of electromagnetic radiation in the wavelength range corresponding to visible light (approximately 390-800 nanometers). In some embodiments, the fluoropolymer blocks some light while transmitting at least about 25%, 35%, or even more light. In some embodiments, the fluoropolymer blocks below about 95%, below about 75%, or even less light. In specific embodiments, from about 35% to about 75% of light can be transmitted through the polymer. These ranges include all levels between their end points. As more light is blocked, the fluoropolymer can be described as translucent. In some aspects of the present invention, the fluoropolymer has a haze level of below about 50% percent, and, independently, clarity of greater than about 25%.

The optical properties of the inventive fluoropolymers can be measured using a "haze-gard plus" light meter from BYK-Gardner USA, Silver Spring, Md., or a Lambda 20 UV-VIS spectrophotometer from Perkin Elmer, using known methods. Further guidance is found in ASTM D-1033—Standard Test Method for Haze and Luminous Transmittance of Transparent Plastics and ASTM D1003-92.

In the various aspects of the invention, the curative composition and/or components thereof, such as the cations, are selected to reduce or eliminate detrimental effects in the desired articles and uses.

The fluoropolymer compositions are useful in production of articles such as O-rings, gaskets, tubing, and seals, especially when a clear perfluoroelastomer article is desired. Such articles are produced by molding a compounded formulation of the fluoropolymer composition with various additives under pressure, curing the article, and then subjecting it to a post-cure cycle. The curable compositions formulated without inorganic acid acceptors are particularly well suited for applications such as seals and gaskets for manufacturing semiconductor devices, and in seals for high temperature automotive uses.

The fluoropolymer compositions of the present invention provide improved (lower) compression set than known fluoropolymer described commercially as optically clear. For example, in some embodiments, the inventive fluoroelastomer compositions provide clear, or even crystal clear, materials having a compression set below about 50% when tested at extreme conditions such as 300° C. In comparison, known commercial optically clear fluoroelastomers have poor compression set resistance, with some approaching 90% when tested at lower temperatures, such as up to 250° C.

The invention will now be described further by way of the following examples.

EXAMPLES

Test Methods

In the following examples, indicated results were obtained using the following test methods, unless otherwise noted. The test results appear in the tables below.

Cure rheology: Cure rheology tests were run on uncured, compounded samples using a Monsanto Moving Die Rheometer (MDR) Model 2000 in accordance with ASTM D 5289-93a at 177° C. (temperature unless otherwise noted), no pre-heat, 30 minute elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ($t_s2$), the time for the torque to reach a value equal to $M_L+0.5(M_H-M_L)$, (t'50), and the time for the torque to reach $M_L+0.9(M_H-M_L)$, (t'90).

Press-Cure: 150×150×2.0 mm sheets were prepared for physical property determination by pressing at about 6.9 MegaPascals (MPa) for various times and temperatures as detailed in the examples.

Post-Cure: Press-cured sample sheets were exposed to heat under air using several different programs as detailed in the examples. The samples were returned to ambient temperature before testing.

Physical Strength: Tensile Strength at Break, Elongation at Break, and Modulus at 100% Elongation were determined using ASTM D 412-92 on samples cut from the press-cure or post-cure sheet with ASTM Die D. Results were recorded in pounds per square inch (psi) and converted to the reported MPa values.

Heat Aging: Press-cured and post-cured sample sheets were cut into dumbbells which were exposed to heat in air for 70 hours at 300° C. and then returned to ambient temperature before testing according to ASTM D 573-99.

Hardness: Samples were measured using ASTM D 2240-85 Method A with a Type A-2 Shore Durometer. Units are reported in points on the Shore A scale.

Compression set: O-ring samples were measured using ASTM 395-89 Method B. The O-rings had a cross-section thickness of 0.139 in. (3.5 mm.). Results are reported as a percentage of permanent set.

Fluid Aging: Press- and post-cured O-rings (or commercially-available comparative O-rings) were exposed to hydraulic fluid (HIJET IVA-PLUS from ExxonMobil, Irving, Tex.) for 70 h at 125° C. and then returned to ambient temperature before volume swell testing according to ASTM D 471-98.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company (Saint Louis, Miss.), Aldrich Chemicals (Milwaukee, Wis.), Fluka (Buchs, Switzerland), or may be synthesized by known methods.

The following abbreviations are used in the Examples:

| Abbreviation | Description |
|---|---|
| TFE | Tetrafluoroethylene |
| PMVE | perfluoro(methyl vinyl ether) |
| MV5CN | $CF_2=CFO(CF_2)_5CN$ |
| PHI | 2-phenyl-1,1,1,3,3,3 hexafluoroisopropanol |
| SPHI | sodium 2-phenyl-1,1,1,3,3,3 hexafluoroisopropanolate |
| TMAPHI | tetra-methylammonium 2-phenyl-1,1,1,3,3,3 hexafluoroisopropanolate |
| TBPPHI | tetrabutylphosphonium 2-phenyl-1,1,1,3,3,3 hexafluoroisopropanolate |
| TBPHI | tetrabutylphosphonium 1,1,1,3,3,3 hexafluoroisopropanolate |
| SHI | sodium 1,1,1,3,3,3 hexafluoroisopropanolate |
| HI | 1,1,1,3,3,3 hexafluoroisopropanol |
| TBPC | tetrabutylphosphonium chloride |
| TPBPC | triphenylbenzylphosphonium chloride |

-continued

| Abbreviation | Description |
| --- | --- |
| Fluoropolymer A | Perfluoroelastomer of 65.6 mole % (mol %) tetrafluoroethylene (TFE), 32.2 mol % PMVE and 2.2 mol % MV5CN made via aqueous emulsion polymerization. |
| Fluoropolymer B | Perfluoroelastomer of 65.7 mol % TFE, 33.0 mol % PMVE and 1.3 mol % MV5CN made via aqueous emulsion polymerization. |
| Aerosil ® R972 | Silica available from Degussa AG, Düsseldorf, Germany |
| N-990 | Carbon black available from Cabot, Boston, MA |

Preparation of Onium Salts Used in the Examples

A desired amount (in millimoles) of a parent alcohol was dissolved to 50 weight percent (wt %) in reagent grade methanol (Aldrich) in a vial and titrated with an equal molar amount of sodium methoxide (25 wt % in Methanol; Aldrich) and left to stand for 10-30 minutes. An equal molar amount of the onium chloride was dissolved to 50 wt % in reagent grade methanol and added to the above solution of the sodium alkoxide under shaking of the vial. Sodium chloride precipitated out during this step. The entire solution/slurry was added as such to the fluoroelastomer on a two roll mill during compounding.

Detailed Example of an Onium Salt Preparation

To prepare 2 millimoles (mmol) of $PhC(CF_3)_2O\ PBu_4$ salt in methanol, 1,1,1,3,3,3-hexafluoro-2-phenyl-2-propanol (0.49 g; 0.002 mole; Aldrich) was dissolved in 0.5 g methanol in a 10 mL vial. Sodium methoxide (0.432 g of a 25 wt % solution in methanol; 0.002 mole; Aldrich) was added dropwise, at room temperature, under gentle swirling of the vial. There is a slight exotherm. The resulting solution of the sodium alkoxide was left to stand for 10 minutes (min.) at room temperature. In a separate vial, tetrabutyl phosphonium chloride (0.59 g; 0.002 mole; Fluka) was dissolved in 0.6 g methanol. This solution was added dropwise and under swirling to the solution of the above prepared sodium alkoxide. A white solid precipitated during this step. The resulting vial containing the tetrabutyl phosphonium alkoxide, including the precipitated solids, was used as such and added dropwise to the perfluoroelastomer gum on a two-roll mill.

Comparative Example A

Fluoropolymer B (100 grams (g)) was compounded on a two roll mill with the addition of a methanol solution of 1.86 mmol of bis-tetrabutylphosphonium perfluoroadipate in methanol (1.5 phr). 1.5 phr of "AEROSIL R-972" silica and 15 phr "N-990" carbon black were also compounded in to the mix.

At a 1.86 mmol per hundred parts gum (mmhr) level, the described compound was molded at 188° C. for 15 minutes in a 2-214 O-ring mold. The O-ring parts were then post cured under forced air in a programmed oven. The oven program was room temperature to 175° C. over 45 min., hold at 175° C. for 16 h then ramp to 200° C. over 30 min., hold at 200° C. for 4 h, then ramp to 250° C. over 30 min., hold at 250° C. for 4 h, then ramp to 270° C. over 30 min., hold at 270° C. for 8 h.

The compression set was measured on O-rings and was 48%. Some of the O-rings were also tested under Fluid Aging for Volume Swell.

Comparative Example B

Fluoropolymer B (100 g) was compounded on a two-roll mill with the addition of PHI (2.5 g), TBPC (2.5 g), "N-990" carbon black (30 g) and "AEROSIL R972" silica (1.5 g).

Comparative Commercial Examples

The following data is taken from current commercial data sheets and is meant to be representative of commercial perfluoroelastomer compression sets. Commercially available O-ring data was reported below.

Comparative Example C

Perfluoroelastomer "CHEMRAZ HT300" (Greene Tweed, Culpsville, Pa.)

Comparative Example D

Perfluoroelastomer "KALREZ SAHARA 8475" (DuPont, Wilmington, Del.)

Comparative Example E

Carbon black filled perfluoroelastomer "KALREZ 4079" (DuPont, Wilmington, Del.)

Comparative Example F

Perfluoroelastomer "COMPOUND FF-200-75" (Parker, Lexington, Ky.)

Example 1

Fluoropolymer A (100 g) was compounded on a two roll mill with the addition of a methanol solution of 2 millimoles of SPHI, prepared by neutralizing 2 mmol of PHI with 25% sodium methoxide in methanol in a 10 mL vial.

At a 2 mmhr level, the described compound was press-cured at 190° C. for 15 minutes (min.). After a step postcure in air (room temperature to 175° C. over 45 min., hold at 175° C. for 16 h then ramp to 300° C. over 2 h and hold at 300° C. for 6 h the compound clearly developed triazine cross-links, as evidenced by FT-IR at $1556\ cm^{-1}$. Physical properties were measured with dumbbells cut from a press and postcured test slab. The compression sets were measured at 25% deflection. The O-rings were crystal clear.

Example 2

Fluoropolymer A was used with the same procedure as Example 1, except that the curative salt used was SHI. The same press and post cure programs were used as in Example 1. A strong triazine signal at $1556\ cm^{-1}$ was evident after post curing. The "triazine ratio" is defined as the ratio of triazine peak area at 1556 cm$^{-1}$ to area under the C—F overtone between 2200-2700 cm$^{-1}$ multiplied by 1000. The "triazine ratio" was 60.4. The sample was optically clear.

Example 3

Fluoropolymer A was used with the same procedure as Example 1 except that the curative salt used had the sodium ion replaced with cesium ion. The cesium salt was prepared as follows. Cs$_2$CO$_3$ (1 mmol, 0.33 g) was slurried in 1 mL of methanol followed by dropwise addition of PHI (2 mmol, 0.49 g). Gas evolution was visible and the flask warmed slightly indicating reaction. This slurry was compounded on the 2 roll mill as in Example 1 with 100 g of the fluoroelastomer gum of Example 1. The same press and post cure programs were used as in Example 1. A strong triazine signal at 1556 cm$^{-1}$ was evident after the post curing regimen of Example 1. The sample was very slightly yellow but optically transparent.

Example 4

Fluoropolymer B (100 g) was compounded on a two roll mill with the addition of a methanol solution of 2 mmol of TMAPHI. No filler was added. The TMAPHI was prepared by dissolving 2 mmol of PHI in 50 wt % methanol in a 10 mL vial and titrating with an equal molar amount of sodium methoxide (50 wt % in methanol) and allowing to stand for 10 min. To this SPHI salt was added 2 mmol of tetramethyl ammonium chloride (available from Alfa Aesar, Ward Hill, Mass.) in 50% methanol and the vial was shaken. Sodium chloride precipitated but the entire slurry was added as such to the two roll mill. The sample was amber-brown after running rheology tests.

Examples 5A-5C

Fluoropolymer A (100 g) was compounded with curative catalyst as in Example 4 except that the curative catalyst was TBPPHI. The catalyst was made similarly to Example 4 except that tetrabutylphosphonium chloride (Fluka, Buchs, Switzerland) was used instead of tetramethyl ammonium chloride. "N990" carbon black filler (30 phr) was compounded in all 3 samples. Example 5A was made with 2 mmol catalyst while 5B used 2.5 mmol catalyst and 5C used 3 mmol catalyst.

Example 6

Fluoropolymer A (100 g) was compounded with 2 mmol curative catalyst as in Example 5 except that the curative catalyst was TBPHI. The catalyst was made similarly to Example 5 except that HI was used instead of PHI. The sample was amber-brown after running rheology tests.

Example 7

Fluoropolymer B (100 g) was compounded as in Example 5 except that it was compounded with 1 phr of the catalyst of Example 5 and 30 phr "N-990" carbon black prior to curing. Press cure was done at 188° C. for 10 min. The post cure program was a ramp from room temperature to 200° C. over 45 min., hold at 200° C. for 2 h, ramp from 200° C. top 250° C. over 30 min., hold at 250° C. for 2 h, ramp from 250° C. to 300° C. over 30 min., hold at 300° C. for 4 h, cool down to room temperature over 1 h.

Example 8

Fluoropolymer B (100 g) was compounded as in Example 6 except that it was compounded with 1.2 phr of the catalyst of Example 6 and 30 phr "N-990" carbon black. Press and post cure were done as in Example 7.

Example 9

Fluoropolymer B (100 g) was compounded as in Comparative Example B except that it was compounded with an additional 6 g Ca(OH)$_2$.

Example 10

Fluoropolymer B (100 g) was compounded as in Example 9 except that it was compounded with an additional 3 g MgO.

Example 11

Fluoropolymer B (100 g) was compounded as in Example 10 except that TBPC onium chloride was replaced with TPBPC onium chloride and no fillers were used.

Example 12

Fluoropolymer B (100 g) was compounded as in Example 10 except that fillers were added. The fillers used were "N-990" carbon black (30 g) and "AEROSIL R-972" silica (1.5 g).

Example 13

Fluoropolymer B (100 g) was compounded on a two roll mill with the addition of a methanol solution of 2.5 mmol of TMAPHI and fillers. The fillers used were "N-990" carbon black (30 g) and "AEROSIL R-972" silica (1.5 g). The TMAPHI was made as in Example 4. Press cure was done at 177° C. for 15 min. The post cure program was a ramp from room temperature to 200° C. over 45 min., hold at 200° C. for 2 h, ramp from 200° C. top 250° C. over 30 min., hold at 250° C. for 2 h, ramp from 250° C. to 300° C. over 30 min., hold at 300° C. for 4 h. then cool down to room temperature over 1 h.

TABLE 1

| | Cure Rheology | | | | | | | | | |
|---|---|---|---|---|---|---|---|---|---|---|
| | Ex1 | Ex 2 | Ex 3 | Ex 4 | Ex 5A | Ex 5B | Ex 5C | Ex 6 | Ex 7 | Ex 8 |
| $M_L$ N m | 0.116 | 0.132 | 0.060 | 0.199 | 0.768 | 0.168 | 0.240 | 0.078 | 0.160 | 0.124 |
| (lb.-in.) | (1.03) | (1.17) | (0.53) | (1.76) | (0.68) | (1.49) | (2.12) | (0.69) | (1.42) | (1.10) |
| $M_H$ N m | 0.406 | 0.667 | 0.516 | 0.284 | 0.449 | 0.503 | 0.471 | 0.484 | 0.951 | 0.794 |
| (lb.-in.) | (3.59) | (5.9) | (4.57) | (2.51) | (3.97) | (4.45) | (4.17) | (4.28) | (8.42) | (7.03) |

TABLE 1-continued

| | | | | | | | | | | |
|---|---|---|---|---|---|---|---|---|---|---|
| t$_s$2 (min) | 12.12 | 9.42 | 13.4 | N/A | 2.73 | 2.24 | 3.28 | 4.54 | 1.53 | 2.38 |
| t'50 (min) | 9.15 | 10.49 | 13.6 | 2.34 | 2.24 | 1.65 | 1.14 | 4.07 | 2.31 | 3.26 |
| t'90 (min) | 13.55 | 21.26 | 26.3 | 6.58 | 6.15 | 4.54 | 2.38 | 9.23 | 7.05 | 8.19 |

| | | Ex 9 | Ex 10 | Ex 11 | Ex 12 | Ex 13 | CE-A | CE-B |
|---|---|---|---|---|---|---|---|---|
| $M_L$ N m | | 0.132 | 0.147 | 0.133 | 0.481 | 0.517 | 0.130 | 0.050 |
| (lb.-in.) | | (1.17) | (1.30) | (1.88) | (4.26) | (4.58) | (1.15) | (0.44) |
| $M_H$ N m | | 0.773 | 1.16 | 0.657 | 1.35 | 1.05 | 1.76 | 0.073 |
| (lb.-in.) | | (6.85) | (10.3) | (5.82) | (11.94) | (9.3) | (15.61) | (0.65) |
| t$_s$2 (min) | | 0.56 | 0.54 | 3.18 | 1.54 | 0.24 | 2.41 | No cure |
| t'50 (min) | | 0.65 | 0.78 | 3.14 | 2.38 | 6.41 | 3.50 | No cure |
| t'90 (min) | | 1.48 | 1.68 | 6.73 | 4.99 | 10.62 | 6.28 | No cure |

Examples 1-4 were carried out at 190° C. rather than 177° C.

TABLE 2

Press-Cured and Post-Cured

| | Ex 1 | Ex 5A | Ex 5B | Ex 5C | Ex 7 | Ex 8 | Ex 13 | CE-A |
|---|---|---|---|---|---|---|---|---|
| Tensile Strength at Break MPa (PSI) | 9.93 (1440) | 10.29 (1492) | 9.846 (1428) | 9.542 (1384) | 12.93 (1875) | 11.07 (1605) | 13.42 (1946) | 13.10 (1900) |
| Elongation at Break (%) | 260 | 251 | 213 | 267 | 235 | 220 | 191 | 170 |
| 100% Modulus Mpa (PSI) | 1.21 (175) | 6.07 (880) | 6.56 (951) | 6.39 (927) | 9.00 (1305) | 8.58 (1245) | 8.17 (1185) | 7.21 (1045) |
| Shore A Hardness | 57 | 80 | 79 | 79 | 81 | 82 | 77 | 79 |

TABLE 3

Compression Set (%)

| | Example | | | | | | | Comparative Example | | | | |
|---|---|---|---|---|---|---|---|---|---|---|---|---|
| | 1 | 5A | 5B | 5C | 7 | 8 | 13 | A | C | D | E | F |
| 72 h at 204° C. | nm | nm | nm | nm | nm | nm | nm | nm | 17 | 23 | 25 | 37 |
| 72 h at 230° C. | 17 | nm | nm | nm | nm | nm | nm | nm | nm | nm | nm | nm |
| 72 h at 250° C. | nm | nm | nm | nm | nm | nm | nm | nm | 30 | 41 | 41 | |
| 72 h at 300° C. | 53 | nm | nm | nm | 22 | 31 | 41 | 48 | 44 | 45 | 45 | 45 |
| 72 h at 316° C. | nm | 49 | 40 | 44 | nm | nm | nm | nm | nm | nm | nm | nm |

In Table 3, "nm" indicates that the sample was not measured, and compression sets were done on 214 O-rings unless indicated otherwise in the specific examples. The Comparative Example C-F data was taken from current commercial data sheets and is believed to be representative of commercial perfluoroelastomer compression set levels.

TABLE 4

Heat Aged

| | Ex 7 | Ex 8 |
|---|---|---|
| Tensile Strength at Break (MPa) & (change) | 9.27 (1345 PSI) (−28%) | 8.38 (1215 PSI) (−24%) |
| Elongation at Break (%) & (change) | 260 (11%) | 260 (9%) |
| Shore A Hardness & (change) | 75 (−6) | 76 (−6) |

TABLE 5

Fluid Aged

| | Ex 7 | Ex 8 | CE-A | CE-E* |
|---|---|---|---|---|
| Volume Swell (%) | 3.8 | 3.3 | 17.0 | 15.6 |

*A commercial O-ring was used for this testing.

The results demonstrate that compositions prepared using the alkoxide cure catalyst exhibit significantly improved properties relative to competitive commercial compositions or to compositions prepared using an adipate cure catalyst. Most notably, the alkoxide-cured catalysts exhibited substantially better (lower) compression set values and substantially lower volume swell in hydraulic fluid.

A number of embodiments of the invention have been described. Nevertheless, it will be understood that various modifications may be made without departing from the spirit and scope of the invention.

We claim:

1. A curative composition comprising a cation and an anion of Formula I:

$$A_n^{q-} Q_p^{m+} \quad (I)$$

wherein m, n, p, and q are positive integers, wherein m*p=n*q, wherein $Q^{m+}$ is an organo onium, and $A^{q-}$ is an anion, provided that at least one $A^{q-}$ is selected from Formula II:

(II)

wherein each R independently is H, halo, alkyl, aryl, aralkyl, or cycloalkyl, and which also may be halogenated, fluorinated, or perfluorinated, wherein two or more of R and R' groups may together form a ring, wherein each R group independently may contain one or more heteroatom(s), wherein R' can be the same as R, with the proviso that R' cannot be halo.

2. The composition of claim 1 wherein each R is F and R' is selected from H, phenyl, methoxyphenyl, toluyl, phenoxy, fluorophenyl, trifluoromethylphenyl, and $CF_3$.

3. A curative composition according to claim 1 selected from tetra-alkylammonium 2-phenyl-1,1,1,3,3,3 hexafluoroisopropanolate, tetra-alkylammonium 1,1,1,3,3,3 hexafluoroisopropanolate, tetrabutylphosphonium 2-phenyl-1,1,1,3,3,3 hexafluoroisopropanolate, tetrabutylphosphonium 1,1,1,3,3,3 hexafluoroisopropanolate, tetrabutylphosphonium 2-methoxyphenyl-1,1,1,3,3,3 hexafluoroisopropanolate, and tetrabutylphosphonium 2-p-tolul-1,1,1,3,3,3 hexafluoroisopropanolate.

4. A method of making the curative of claim 1, comprising providing a cation and an anion, wherein the anion is prepared by:
(i) reacting a parent alcohol with a base, the base optionally being selected from a tetraalkyl phosphonium or ammonium hydroxide; or
(ii) reacting a parent alcohol with a metal hydroxide or alkoxide, optionally selected from sodium methoxide, and in a solvent, adding an onium halide, optionally selected from an onium chloride, and optionally precipitating a salt.

* * * * *

UNITED STATES PATENT AND TRADEMARK OFFICE
CERTIFICATE OF CORRECTION

PATENT NO. : 7,402,630 B2  Page 1 of 1
APPLICATION NO. : 11/014042
DATED : July 22, 2008
INVENTOR(S) : Werner M. A. Grootaert It is certified that error appears in the above-identified patent and that said Letters Patent is hereby corrected as shown below:

Column 4
Line 17, delete "-tolul-" and insert -- -toluyl- --, therefor.

Column 21
Line 3, in Claim 1, delete "periuorinated," and insert -- perfluorinated, --, therefor.

Column 22
Line 2, in Claim 3, delete "-tolul-" and insert -- -toluyl- --, therefor.

Signed and Sealed this

Twenty-third Day of December, 2008

JON W. DUDAS
*Director of the United States Patent and Trademark Office*